July 10, 1956   W. J. ABEL   2,753,644
FISHING DEVICE
Filed July 21, 1954   2 Sheets-Sheet 1
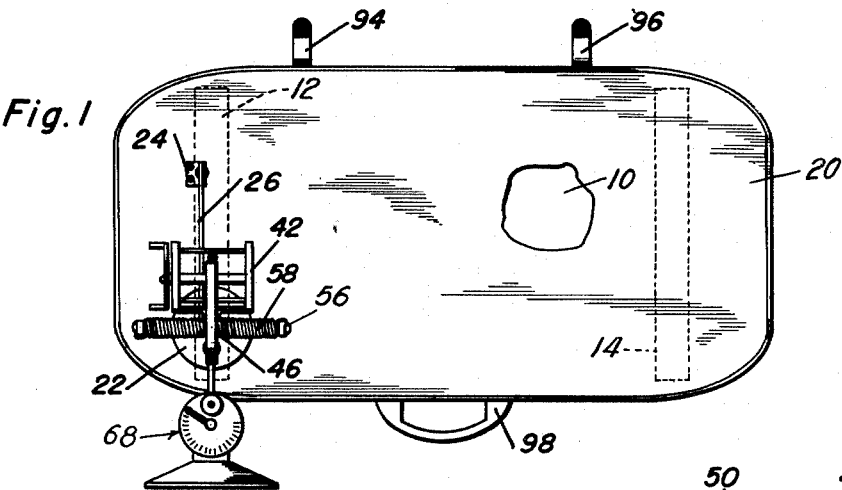
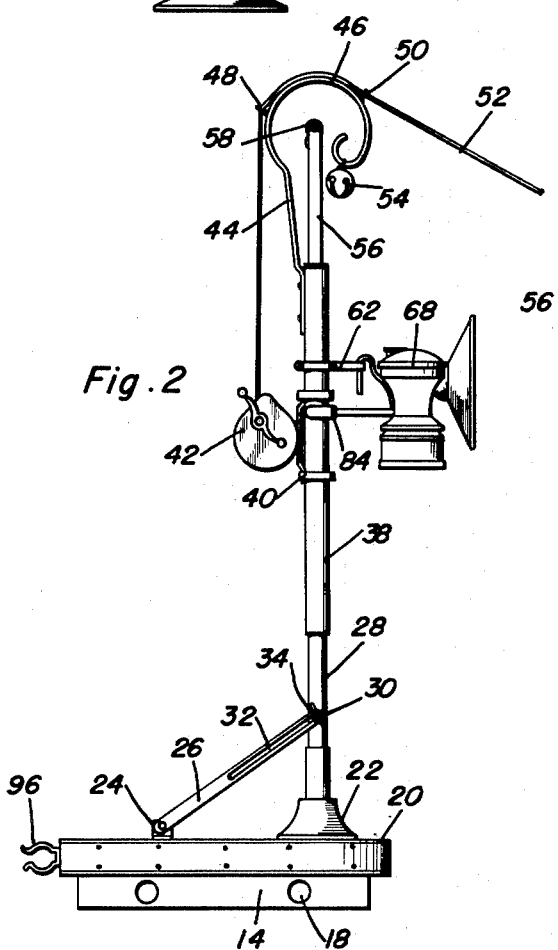
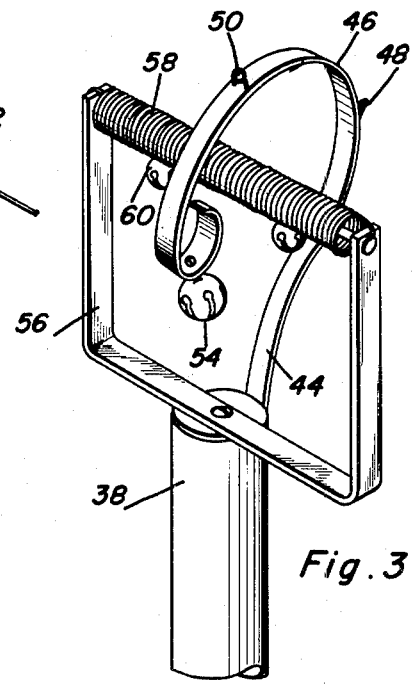
Wilbur J. Abel
INVENTOR.
BY
Attorneys July 10, 1956 W. J. ABEL 2,753,644
FISHING DEVICE
Filed July 21, 1954 2 Sheets-Sheet 2
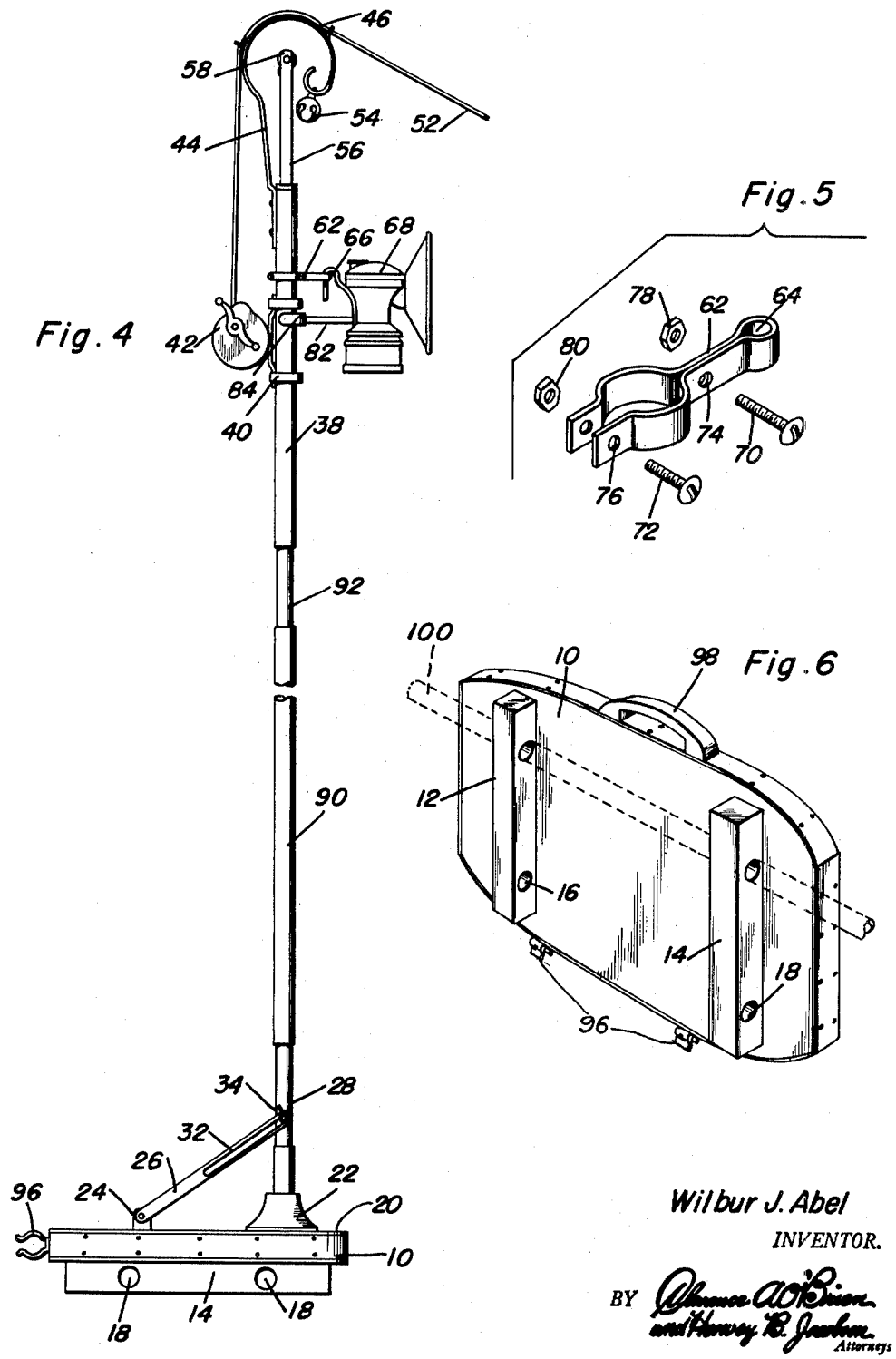
Wilbur J. Abel
INVENTOR.

United States Patent Office 2,753,644
Patented July 10, 1956

2,753,644

FISHING DEVICE

Wilbur J. Abel, Michigan City, Ind.

Application July 21, 1954, Serial No. 444,704

2 Claims. (Cl. 43—17)

This invention relates to a portable knockdown fishing device and particularly to a compact novelly equipped stand to be handily transported and erected for use by a fisherman and having a platform for the fisherman to sit on or stand on and a fishing pole having audible signalling means so that the fishman will know when a fish has taken the line.

Heretofore considerable difficulty has been experienced in providing comfortable fishing arrangements and reliable equipment when a fisherman arrives at the fishing place.

The present invention relates to a compact and convenient fishing stand comprising a suitable base functioning as a handy platform on which the fisherman may sit or stand as may be desirable, said base having means for securely mounting a pole in an upright position thereon temporarily attaching its sections and complements on and having a fish line supporting head thereon together with signalling devices operable by a fish biting on the hook and having a lamp and supporting device therefor so that the fisherman may be able to see or to use the light to attract fish as may be desired.

It is accordingly an object of the invention to provide an improved fishing device.

It is a further object of the invention to provide a fishing device which may be readily carried about.

It is a further object of the invention to provide an improved alarm device for a fisherman's outfit.

Other objects and many of the attendant advantages of the present invention will be apparent from the following detailed description taken in conjunction with the accompanying drawings, in which:

Figure 1 is a top plan view of the fishing device in operative position;

Figure 2 is a side elevational view of the fisherman's device;

Figure 3 is an enlarged perspective view of the resilient line supporting head of the device;

Figure 4 is a view similar to Figure 2 but showing an elongated or extension pole mounted between the base and the head;

Figure 5 is an exploded perspective view of a lamp bracket for frictionally engaging the mounting tube of the device;

Figure 6 is a perspective view of the device in carrying position.

In the exemplification according to the invention a base plate 10 is preferably of an elongated formation and may have the corners cut away to provide convenience in handling and the like. A pair of cross support members 12 and 14 are provided on the base 10 for the purpose of supporting the base 10 so that it will not be split or bent during operation therewith and so that the device may be firmly and rigidly set on the ground, in the bottom of a boat, on the dock or the like. The supports 12 and 14 are provided with a plurality of aligned apertures 16 and 18 for the purpose presently to be described.

Preferably the base 10, which serves as the stated platform is constructed of wood and one side at least is provided with a covering 20 of relatively pliable water impervious material such as rubber, plastic or the like.

A socket member 22 is rigidly mounted on the base 10 preferably adjacent one end and adjacent one edge thereof so that it is substantially in a corner of the base. A bracket 24 is also rigidly mounted on the base 10 preferably in spaced relation to the socket member 22 and substantially rearwardly thereof. A brace 26 is pivotally mounted on the bracket 24 and has a length greater than the effective length between the bracket 24 and the socket member 22. A rod section 28 is mounted in the socket member 22 and is provided with a stud 30 which is engageable with a slot 32 in the brace 26 and carries a wing nut 34 so that the brace 26 may be connected to the rod section 28 in spaced relation from the socket 22 and rigidly connected thereto so that the rod section 28 will be rigidly held in vertical relation with respect to the surface of the base plate 10.

A head mounting tube 38 is slidably received on the rod section 28 and is provided with a reel seat 40 intermediate the ends thereof for supporting a suitable reel 42 on which a fishing line may be wound. As is best shown in Fig. 3 a U-shaped member 56 is provided and the bight portion thereof is secured to the upper end of the pole, that is the tube portion 38 thereof. A coil spring 38 is stretched between and has its ends secured to the upper ends of the arm portions of the U-shaped member. In practice the coils of this spring 58 serve to releasably grip a fishing line (not shown). It follows that when the fishing line is activated by a pull on the same and, assuming that the line is gripped between two of the coils, the signalling bells 60 carried by the spring will obviously be caused to sound. A substantially J-shaped spring 44 is also provided and the lower end of the arm portion is attached to the pole. The upper free end of the arm is fashioned into an arcuately shaped portion 46 provided at longitudinally spaced points of accessible fishing line guides 48 and 50. It will be noticed too that the upper or free end of the arcuate potrion is, in turn, provided with a return bend and this is disposed in close proximity to the intermediate portion of the coil spring 58 and it is provided with and suspends a signalling bell 54.

A folded clip 62 is provided with an eye 64 for engaging the hook 66 of a suitable lamp device 68. A pair of locking screws 70 and 72 extend through suitable apertures 74 and 76 in the folded clamp member 62 and the screws 70 and 72 are provided with nuts 78 and 80 operable to frictionally secure the clip 62 on the mounting tube 38.

The lamp device herein indicated as a gas generating lamp 68 is provided with a base member 82 having a bifurcated head 84 engaging the tube 38 so that the lamp 68 may be properly rigidly mounted on the mounting tube 38.

When it is desired to use the device as a stand up device or when it is necessary to have greater height in order to properly dispose of the fishing line the head mounting device 38 may be readily elevated by means of a tubular sleeve 90 which will telescope over the rod section 28 and into which an extension rod section 92 may be inserted so that the head mounting tube 38 may be inserted on the extension rod 92 at the desired level.

In order to carry the head mounting tube 38 together with the accessories thereon a pair of clips 94 and 96 are provided on the base 10 so that the mounting tube 38 may be removed from the rod 28 or the extension rod 92 and placed in the clips 96 and 94 to be readily carried thereby and a handle 98 is provided at the other side of the base so that the entire device may be picked up and readily carried. In order to stow the rod sections 28, 90, 92 and the like the aligned apertures 16 and 18 are designed to slidably and frictionally engage the sections so that the sections may be placed in carrying position as shown at 100 in Figure 6.

When the device is to be used as a short stand on the pier or on the land the extension tube 90 and extension rod 92 may be omitted and the fisherman may use the platform 10 as a convenient seat on which to sit during the fishing operation. When it is necessary to employ the stand in a boat or other position where it may be necessary to stand on the platform 10 if desired the head may be raised to the proper height for the fisherman to conveniently operate while standing up. When operating for big fish the line 52 will be carried over the resilient head 46 and secured thereon so that when the tug of a big fish is had the bell 54 will operate. However, when relatively small fish are to be expected the line 52 will be removed from the guides 48 and 50 and will be secured between the adjacent turns of the spiral spring 58 which is of relatively less strength than the resilient head 46 so that when the relatively lighter impact is felt on the line the bells 60 will be actuated.

For night operations the lamp 68 of any desired type may be hung on the frictionally engaged brackets 62 and supported against the mounting tube 38 for operation during fishing and when the device is to be carried the lamp may readily be removed from the device and carried in the hand of the fisherman so that he will be able to find his way in the darkness.

What is claimed as new is as follows:

1. A portable knockdown unattended-type stand comprising, in combination, a base on which a user may stand, sit or merely rest his feet, a vertically disposable fishing pole supported on said base, a fishing line reel carried by said pole, a U-shaped member having a bight portion secured to the upper end of said pole, a coil spring stretched between and secured at its ends to the arms of said U-shaped member, the coils of said spring being adapted to releasably grip a fishing line, signaling bells attached to and operatively suspended by said coil spring, a substantially J-shaped spring having a free end arcuate shaped portion provided with line guides and an arm portion attached to said pole, said arcuate shaped portion arching over and partially embracing the coil spring, and a single signaling bell carried by said arcuate shaped portion.

2. The structure defined in claim 1, and wherein the free end of said arcuate shaped portion is provided with a return bend portion disposed in close spaced proximity in respect to intermediate portion of said coil spring, said single signaling bell being carried by said return bend portion.

References Cited in the file of this patent

UNITED STATES PATENTS

| | | |
|---|---|---|
| 374,737 | Geils | Dec. 13, 1887 |
| 467,120 | Kunzel | Jan. 12, 1892 |
| 975,882 | Becker et al. | Nov. 15, 1910 |
| 1,091,491 | Ebur | Mar. 31, 1914 |
| 2,196,472 | Moriarty | Apr. 9, 1940 |
| 2,541,759 | Hamre | Feb. 13, 1951 |
| 2,574,333 | Kuczynski | Nov. 6, 1951 |
| 2,595,230 | Daviau | May 6, 1952 |
| 2,684,509 | Couturier | July 27, 1954 |
| 2,714,270 | Premo | Aug. 2, 1955 |